July 16, 1957    G. S. SUPPIGER ET AL    2,799,432
DEPOSITING MACHINE
Filed Aug. 6, 1953      3 Sheets-Sheet 1
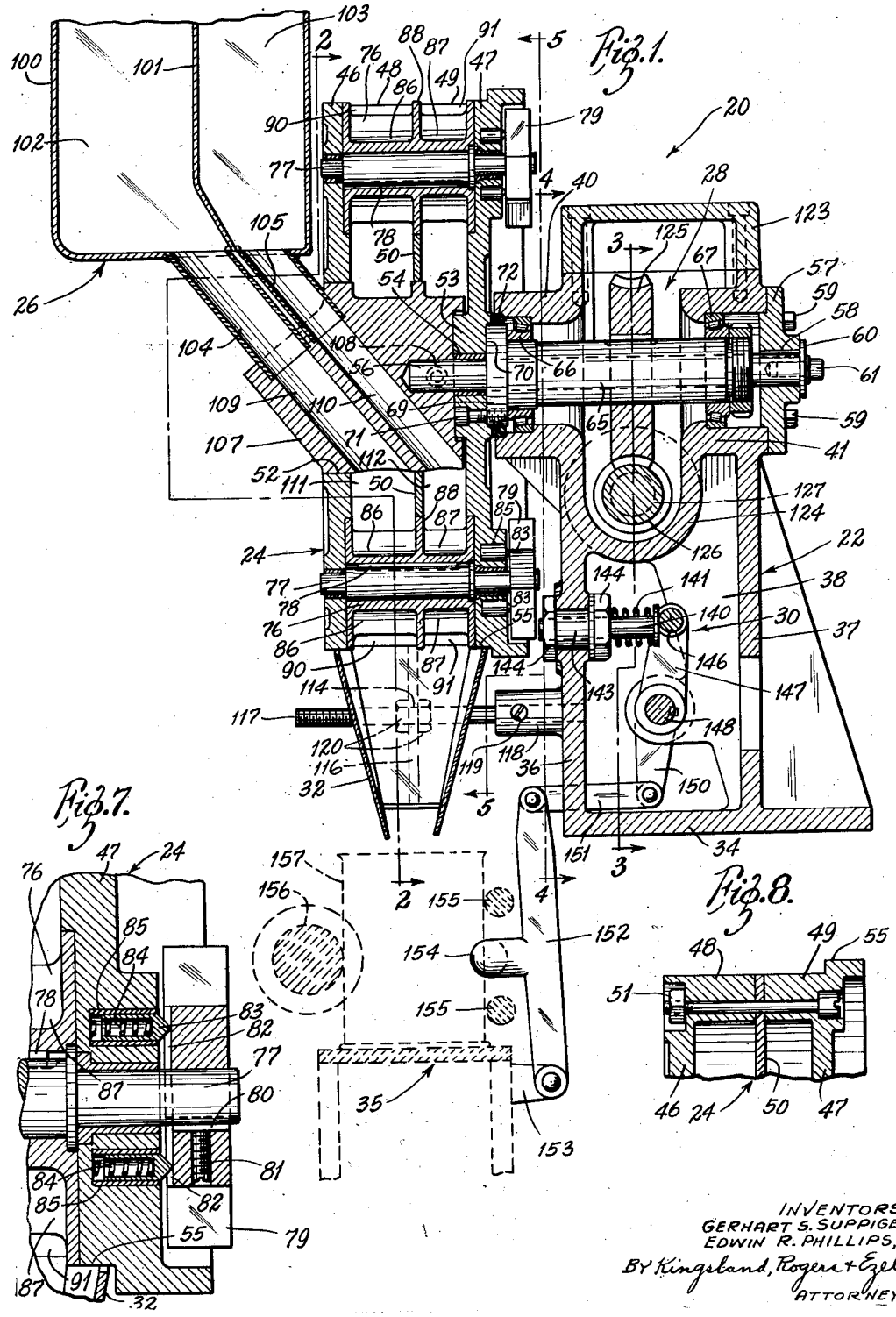
INVENTORS:
GERHART S. SUPPIGER,
EDWIN R. PHILLIPS,
BY Kingsland, Rogers & Ezell
ATTORNEYS

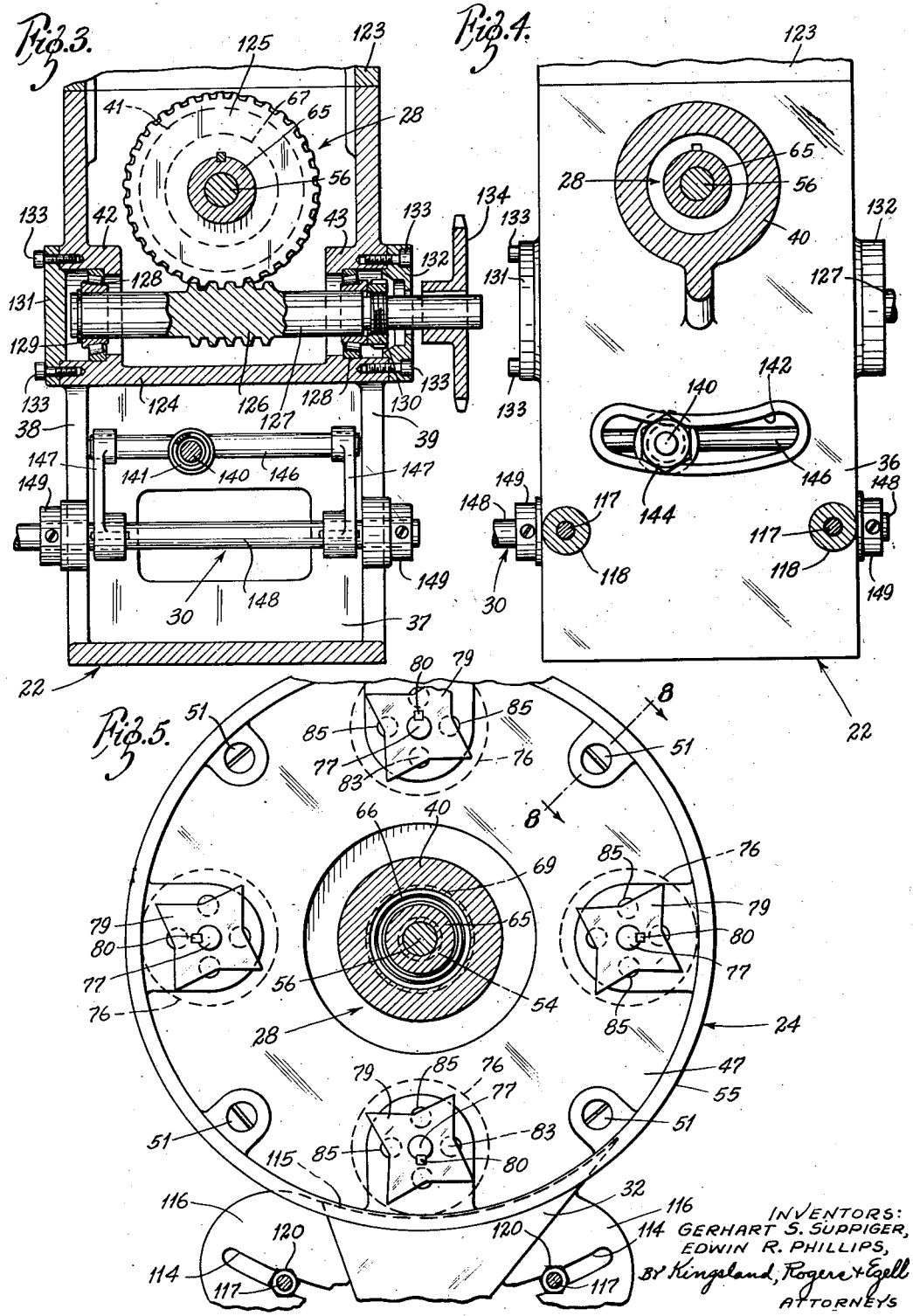

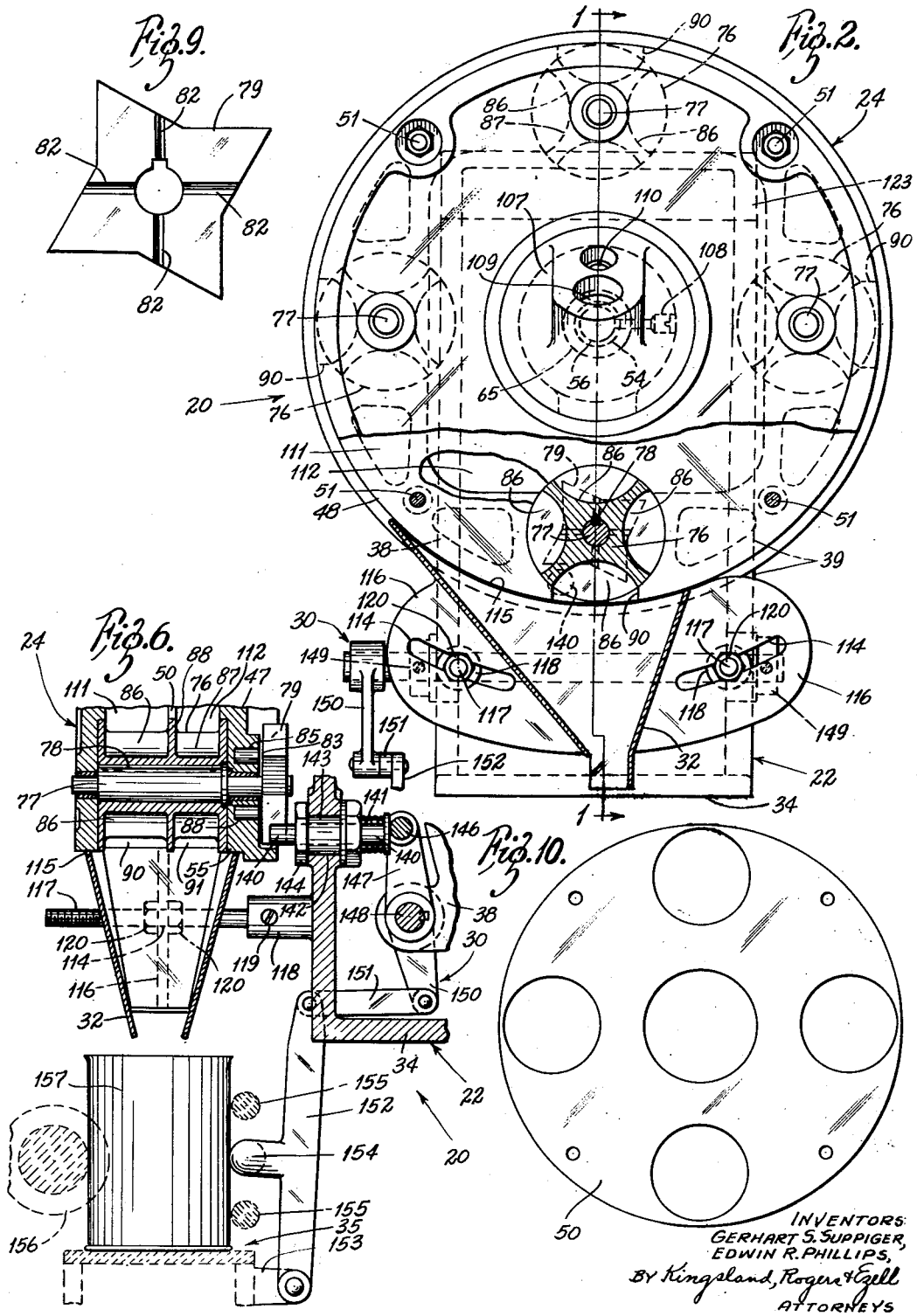

United States Patent Office 2,799,432
Patented July 16, 1957

2,799,432
DEPOSITING MACHINE

Gerhart S. Suppiger, Belleville, and Edwin R. Phillips, Evanston, Ill., assignors, by mesne assignments, to Morton Salt Company, Chicago, Ill., a corporation of Illinois Application August 6, 1953, Serial No. 372,676

11 Claims. (Cl. 222—139)

The present invention relates generally to depositing machines, and more particularly to a novel machine predeterminately capable of depositing either increments of a single selected granular or liquid material, as salt, or simultaneously increments of two or more such materials.

In brief, the present novel machine is a rotary type mechanism which deposits in moving cans, or the like, predetermined increments of granular or liquid materials. The machine includes a revolving drum assembly which may have one, two, or more compartments, and a stationary hopper assembly having a corresponding number of compartments and transfer chutes. The drum and hopper assemblies are suitably mounted upon a base which also supports mechanism for revolving the drum assembly. The drum assembly incorporates one or more revolving discharge valves, each of which is rotated by a star wheel when the latter is tripped by a can-actuated unit mounted on the base. Gravity and centrifugal force continue to effectively discharge material from the discharge valves into an adjustably mounted depending funnel. The position of the star wheel tripping member of the can-actuated unit is adjustable, so that the discharge of material may be timed with the movement of the can, or the like, which receives the same. The number of deposits per minute may be varied between wide limits.

Therefore, an object of the present invention is to provide a novel revolving type depositing machine which is capable of efficiently depositing granular and liquid materials in predetermined amounts and in a preselected number of selected materials.

Another object is to provide a novel revolving type machine which will efficiently deposit predetermined amounts of bulk salt, or the like, at predetermined rates.

Another object is to provide a novel revolving type machine having peripherally located discharge valves from which materials are compacted and discharged by centrifugal force and gravity, and in which centrifugal force is highly effective when the valves are rotated at high speeds.

Another object is to provide a novel revolving type machine having an adjustable funnel for receiving materials from discharge valves and directing it into moving containers.

Another object is to provide a novel revolving type depositing machine which is adapted to be preselectively set up to deposit simultaneously increments of one or more granular or liquid materials which incorporates one or more rotatable materials discharge valves each of which preselectively includes one or more pockets for measuring the discharging materials.

Another object is to provide a novel revolving type machine for depositing granular or liquid materials which is can-operated and which is not actuated to deposit material in the event no can is disposed in material-receiving position beneath the machine.

Another object is to provide a novel revolving type machine for depositing granular or liquid materials, the material-receiving drum of which is continuously rotated by selected mechanism from powered units within the plant where the machine is used, or by an independent electric motor, or the like.

Another object is to provide a novel revolving type machine for depositing granular or liquid materials which incorporates adjustable means for tripping the revolving discharge valves of the machine to insure discharge of the material in timed relation with a moving can, or the like, which receives the charge.

Other objects are to provide a novel revolving type machine for depositing granular or liquid materials which is adjustable in various components, which is susceptible of modification as to repetition of parts or units, which functions efficiently at any selected rate of rotation, and which fulfills the requirements of granular or liquid material depositing machines.

The foregoing and other objects and advantages are apparent from the following description taken with the accompanying drawings, in which:

Fig. 1 is a transverse, vertical, cross-sectional view through a machine for depositing granular or liquid material which incorporates the teachings of the present invention, taken on substantially the line 1—1 of Fig. 2;

Fig. 2 is a vertical, longitudinal, cross-sectional view taken on substantially the line 2—2 of Fig. 1;

Fig. 3 is a vertical, longitudinal, cross-sectional view taken on substantially the line 3—3 of Fig. 1;

Fig. 4 is a vertical, longitudinal, cross-sectional view taken on substantially the line 4—4 of Fig. 1;

Fig. 5 is a vertical, longitudinal, cross-sectional view taken on substantially the line 5—5 of Fig. 1;

Fig. 6 is a fragmentary view of the lower portion of Fig. 1, illustrating the star wheel tripping unit in operative position;

Fig. 7 is an enlarged cross-sectional view through a star wheel and associated spring-loaded plungers;

Fig. 8 is a cross-sectional view on substantially the line 8—8 of Fig. 5;

Fig. 9 is an enlarged rear elevational view of one of the star wheels; and

Fig. 10 is a side elevational view of a drum divider disc.

Referring to the drawings more particularly by reference numerals, 20 indicates generally a machine for depositing granular or liquid materials constructed in accordance with the teachings of the present invention. Broadly, the machine 20 includes a base 22, a revolving drum assembly 24, a hopper assembly 26, a power assembly 28 for revolving the drum assembly 24, a star wheel tripping unit 30, and a funnel 32 for directing material released from the drum assembly 24 into a can or other material-receiving receptacle.

More specifically considering the several components of the machine 20, the base 22 includes a floor or platform 34 which may have apertures (not shown) to receive screws or bolts for mounting the base 22 upon a suitable platform, or the like, located, for instance, adjacent a can conveyor 35. Extending vertically from the platform 34 are opposed side walls 36 and 37 and opposed end walls 38 and 39 (Figs. 1 and 3). Aligned bearing supporting sleeves 40 and 41 are formed in the side walls 36 and 37 (Fig. 1), respectively, and aligned bearing supporting sleeves 42 and 43 are formed in the end walls 38 and 39, respectively (Fig. 3).

The revolving drum assembly 24 is located adjacent the side wall 36 of the base 22 (Fig. 1). The drum assembly 24 includes opposed side members 46 and 47 of disc configuration which include opposite annular flanges 48 and 49, respectively, abutting a divider disc plate 50. Nut and bolt assemblies 51 maintain the side members 46 and 47 and the divider plate 50 in assembled relation (Fig. 8). The members 46 and 47 and the plate 50 may be cast as an integral unit, or otherwise formed. The side member 46 has a large central opening 52. The side member 47 has a centrally disposed apertured mounting boss 53 (Fig. 1) and an annular flange 55. Within the aperture of the supporting boss 53 is press-fitted a sleeve 54. The sleeve 54 receives in freely rotatable relation in respect thereto one end of a stationary shaft 56, as is clear from Fig. 1, the other end of the shaft 56 being supported in a cap member 57 and maintained against rotation in respect thereto by a key 58 disposed in suitable longitudinal grooves in the shaft 56 and the cap 57. The cap 57 is secured in closing relation to the bearing supporting sleeve 41 by a plurality of bolts 59. A large washer 60 of greater diameter than the shaft 56 is secured to the end thereof by a suitable bolt 61 and limits movement of the shaft 56 to the left, viewing Fig. 1.

A sleeve 65 is mounted concentrically of the shaft 56 in bearings 66 and 67 mounted in the bearing supporting sleeves 40 and 41, respectively, each being disposed against an internal shoulder to limit movement toward each other. The sleeve 65 includes an enlarged annular segment 69 disposed outwardly of the bearing 66 which fits into a well 70 of the supporting boss 53. Bolts 71 secure the supporting boss 53 to the enlarged annular segment 69. A sealing ring 72 is disposed between the portion 69 and the mouth of the bearing supporting sleeve 40. Hence, the drum assembly 24 is supported for rotation on the end of the sleeve 65.

The drum assembly 24 also includes four revolving materials discharge valves 76 which are spaced ninety degrees apart about the side members 46 and 47. Preferably, each discharge valve 76 is of the cross section and configuration clearly shown in Figs. 1 and 2, and is mounted upon a stub shaft 77 having bearing support in the side members 46 and 47. Each discharge valve 76 is secured to its shaft 77 by a key 78. Each stub shaft 77 extends through the wall 47 and has a star wheel 79 secured thereto for rotation therewith by a key 80 and a setscrew 81 (Fig. 7). The star wheels 79 are of the configuration clearly shown in Figs. 7 and 9, each including across its rear face four right angularly disposed grooves 82, the two opposed grooves 82 receiving plungers 83 to determine the position of the discharge valves 76 in relation to the interior of the drum assembly 24. Each plunger 83 is hollow and receives a spring 84 which biases it at all times toward the star wheel 79. The plungers 83 are mounted in sleeve-lined wells 85 formed in the wall 47. Each discharge valve 76 includes four pockets 86 and four pockets 87 separated by a fin 88. Openings 90 and 91 are formed in the flanges 48 and 49 outwardly of each discharge valve 76 of a configuration to permit discharge of material within the lowermost pockets 86 and 87 when the discharge valve 76 is at the correct discharge position in the rotation of the drum assembly 24.

The hopper assembly 26 includes a stationary hopper bin 100 of rectangular or other selected configuration which includes a partition wall 101 dividing the same into two compartments 102 and 103. Communicating with the compartments 102 and 103 through the bottom of the bin 100 are angularly directed discharge tubes 104 and 105, respectively, which are secured in position by welding, or the like. A stationary drum feed member 107 of the configuration shown in Figs. 1 and 2 is disposed centrally of the drum assembly 24 and is secured to the free end of the shaft 56 by a setscrew 108, or the like. The feed member 107 includes passageways 109 and 110 which, respectively, receive the lower ends of the tubes 104 and 105, and which open, respectively, into compartments 111 and 112 within the drum assembly 24 on opposite sides of the divider plate 50. Braces (not shown) may be employed to firmly locate the hopper assembly 26, if desired.

The funnel 32 is adjustably mounted beneath the drum assembly 24 and includes an arcuate upper edge 115 which follows the outer periphery of the annular flanges 48 and 49 (Fig. 2). The funnel 32 is supported from two outwardly extending integral fins 116 having arcuate slots 114 therein concentric with the drum assembly 24 which are received by spaced threaded pins 117 extending from bosses 118 and maintained therein by setscrews 119, the bosses 118 being formed integral with the side wall 36 of the base 22. Front and rear nuts 120 on the pins 117 maintain the funnel 32 in selected relation to the drum assembly 24. As is clear from Fig. 1, the innermost position of the funnel 32 is determined by the annular flange 55 of the side member 47 of the drum assembly 24.

The power assembly 28 includes a worm gear 125 keyed to the sleeve 65 and disposed within the base 22 above a partition 124 and beneath a removable cover 123 comprising a gear box (Figs. 1 and 3). In mesh with the worm gear 125 is a worm 126 formed integral with (or secured to) a shaft 127 rotatably supported in bearings 128 mounted in the aligned bearing supporting sleeves 42 and 43. The stub shaft 127 and the bearings 128 are maintained in position by a ring 129 in a groove at one end of the shaft 127 and a nut 130 interiorly of the other end thereof, both bearings 128 abutting flanges formed integral with the sleeves 42 and 43. Caps 131, 132 close the outer ends of the sleeves 42 and 43, respectively, being secured in place by suitable cap screws 133. The stub shaft 127 has a reduced portion extending through an opening in the cap 132 which receives a sprocket 134 on the free end thereof which is keyed thereto. It is to be understood that a chain is trained about the sprocket 134 and about a sprocket mounted upon a powered filler or other piece of equipment.

The star wheel tripping unit 30 includes a headed trip pin 140 supported in the base wall 36 for reciprocal movement, a compression spring 141 being disposed about and biasing the trip pin 140 toward inoperative or no can position (Figs. 1, 3 and 6). As is clear from Figs. 1 and 4, the trip pin 140 is mounted for lateral adjustment in an arcuate slot 142 by means of a sleeve segment 143 externally threaded at its ends which receive securing nuts 144. In engagement with the head of the trip pin 140 is a horizontal movable shaft segment 146 which is supported at its ends by levers 147 secured to a horizontal rockable shaft 148 for movement therewith. The shaft 148 is mounted in bosses formed in the end walls 38 and 39 of the base 22, and is maintained against longitudinal movement by collars 149. To one free end of the shaft 148 is secured a lever 150 to the free end of which is pivotally connected a link 151 (Figs. 1 and 2). A can indicator gate member 152 is pivotally connected to the other end of the link 151 at its upper end and is pivotally connected to a bracket 153 at its lower end, the bracket 153 being mounted upon the conveyer 35, or other suitable support. The member 152 includes a can-engageable extension 154 which is disposed between the usual guide rails 155 of the conveyer 35. In Fig. 1, the star wheel tripping unit 30 is shown in the no can position, a can 157 being shown in dotted lines as approaching the extension 154 under the guidance of a standard can feed screw 156. In Fig. 6, the can 157 is shown in engagement with the extension 154 and the star wheel tripping unit 30 is illustrated in tripping or operative position. Note that the star wheels 79 and connected valves 76 rotate in directions opposite to the rotation of the whole drum assembly 24, which aids in moving each charge in a more compact mass.

It is to be understood, of course, that the present embodiment is illustrative: fewer or a greater number of valves 76 than four may be used, and each may have fewer or a greater number of pockets 86 and 87 than four; the star wheels 79 may be of other selected configurations, the power assembly 28 may take some other forms; and other elements may be changed in form or number.

Operation

The illustrated embodiment of the depositing machine 20 is capable of successively depositing two granular or liquid materials in predetermined amounts simultaneously in cans 157 successively located beneath the funnel 32. For example, bulk salt may be placed in the compartment 102 and a vitamin granular or liquid material placed in the compartment 103 for subsequent simultaneous deposit in preselected amounts in the can 157. Obviously, the partition wall 101, the divided plate 50, and the fins 88 may be eliminated to provide a machine 20 for depositing a single granular or liquid material; or these several enumerated parts may be multiplied for the simultaneous deposit of more than two granular or liquid materials.

The machine 20 is reversible. That is, the drum assembly 24 may be rotated in the opposite direction, if desired, simply by removing and turning over the star wheels 79, adjusting the trip pin 140 to the other end of the slot 142, and reversing the position of the funnel 32. For such use, the star wheels 79 are grooved on both sides.

It is also clear that the drum assembly 24 and the hopper assembly 26, as well as other parts, may be readily and easily removed and dismantled for cleaning, repair or replacement.

Manifestly, materials for deposit placed in the compartments 102 and 103 will pass through the tubes 104 and 105, respectively, and through the passageways 109 and 110 into the compartments 111 and 112 of the revolving drum assembly 24 under the influence of gravity.

While the machine 20 is in use, the drum assembly 24 is normally rotated at a constant speed which is timed to the movement of the cans 157 by the conveyer 35 and the can feed screw 156, so that a discharge valve 76 will be brought into depositing position each time a can 157 passes beneath the funnel 32. As described above, the drum assembly 24 is rotated by power from the filler or other machine, but it is to be understood that the drum assembly 24 may be rotated by an electric motor associated with the machine 20, or by any other selected drive means.

The trip pin 140 is adjustably positioned to trip a star wheel 79 in timed relation for the deposit of a charge of material from the connected revolving discharge valve for deposit in a can 157 moving along the conveyer 35. As is described above, the trip pin 140 is moved into position to trip the next star wheel 79 by engagement of the approaching can 157 with the extension 154 of the can indicator gate member 152. The spring-loaded plungers 83 engaging in the grooves 82 in the back of the star wheels 79 are effective to prevent overrun of the respective star wheels 79 and the associated discharge valves 76.

It is clear that the drum assembly 24 may be rotated at any desired reasonable speed, and that it will readily keep up with a fast, as well as a slow, moving conveyer line. The number of deposits per minute will depend upon the number of valves 76 included in the drum assembly 24 as well as upon the speed of rotation thereof. Rates of deposit approaching a thousand per minute can be obtained with four valves 76, a rate which can be increased by the use of additional valves 76. Centrifugal force, as mentioned, is effective to compact granular material and to quickly remove the charges of material from the valves 76 in high speed operation of the machine 20; in low speed operation, gravity drop of the charges is adequate. The adjustability of the funnel 32 renders it operative to receive and direct a charge to a container, since its position will be adjusted in accordance with the predetermined speed of the drum assembly 24.

When liquids are to be deposited, a series of small flights are located internally around the perimeter of the drum assembly 24 in a crosswise position, in order to get the liquids moving and thus gain the advantage of centrifugal force.

It is manifest that there has been provided a depositing machine which fulfills the objects and advantages sought therefor.

It is to be understood that the foregoing description and the accompanying drawings have been given by way of illustration and example. It is also to be understood that changes in form numbers of the elements, rearrangement of parts, and substitution of equivalent elements, which will be obvious to those skilled in the art, are contemplated as within the scope of the present invention which is limited only by the claims which follow.

What is claimed is:

1. A depositing machine comprising a rotatable drum assembly including a materials drum, independently rotatable material measuring and discharging valves in said drum, and a star wheel mounted for rotation with each valve disposed exteriorly of said drum, means for continuously supplying materials to said drum, means for continuously rotating said drum assembly, a trip pin biased to position out of the bodily rotatable path of said star wheels, and can-actuatable means for moving said trip pin into the path of a star wheel to effect rotation therethrough of the connected valve to discharge material from said drum.

2. A depositing machine comprising a rotatable drum assembly including a materials drum, independently rotatable material measuring and discharging valves in said drum, and a star wheel mounted for rotation with each valve disposed exteriorly of said drum, means for continuously rotating said drum assembly, a trip pin biased to position out of the bodily rotatable path of said star wheels, and can-actuatable means for moving said trip pin into the path of a star wheel to effect rotation therethrough of the connected valve to discharge material from said drum.

3. A depositing machine comprising a rotatable drum assembly including a materials drum having a materials compartment, independently rotatable material measuring and discharging valves in said drum for measuring out predetermined amounts of material in bulk in said compartment for subsequent discharge, and a member mounted for rotation with each valve disposed exteriorly of said drum, means for continuously supplying materials to said drum, means for continuously rotating said drum assembly, a trip member biased to position out of the bodily rotatable path of said exteriorly mounted member, and can-actuatable means for moving said trip member into the path of an exteriorly mounted member to effect rotation therethrough of the connected valve to discharge material from said drum.

4. A depositing machine like that of claim 3 in which said drum compartment includes compartments separated by a partition and in which said measuring and discharging valves include partitions in substantially the plane of the said partition separating the drum compartments.

5. A rotary depositing machine comprising a base, a drum assembly rotatably mounted on said base including means to receive and to discharge granular or liquid material, said discharge means including rotary measuring valves spaced around the periphery of said drum assembly, said valves having means for measuring increments of material and for discharging said material from said drum assembly at substantially right angles to the axis of the drum assembly through openings cooperating with the valves on the outside periphery of the drum assembly, each valve including a plurality of circumferentially positioned pockets for measuring and receiving materials from said drum assembly, and means for rotating said valves successively a predetermined amount, said valves being rotatable on an axis parallel to the axis of the drum assembly.

6. In a rotary depositing machine, a rotatably mounted drum assembly comprising a drum having a material receiving compartment, rotatable material discharge valves mounted in said drum having a plurality of pockets, said pockets opening radially inwardly and outwardly for receiving and discharging material, said drum having openings facing radially outwardly and in communication with the outwardly opening pockets of each valve, and means for rotating said valves to successively dispose pockets of material in said openings as discharge is required.

7. A rotary depositing machine comprising a base, a drum assembly rotatably mounted on said base including means to receive and to discharge granular or liquid material, said material receiving means including a stationary feed member, hopper means positioned above and communicating with said feed member for charging material thereto by gravity, said discharge means including rotary pocketed valves for measuring, storing and discharging increments of material from said drum assembly, means for rotating said valves and their pockets with respect to the drum assembly successively a predetermined amount, said last-named means including an actuating member pivotally connected to the base and adapted to be contacted by a moving can or the like, said actuating member being biased to a normal non-operating position to prevent operation of said valve rotating means when no can, or the like, is ready to receive a charge from said drum assembly.

8. A rotary depositing machine comprising a base, a drum assembly having a plurality of compartments rotatably mounted on said base including means to receive and to discharge granular or liquid material, said discharge means including rotary valves spaced around the periphery of said drum assembly for measuring and discharging increments of material from said drum assembly, each valve including a plurality of chambers, each chamber being partitioned to provide measuring pockets for measuring and receiving materials from said drum assembly, there being the same number of pockets for each chamber to simultaneously and individually receive said materials as there are compartments in the drum assembly, and means for rotating said valves a predetermined amount.

9. A rotary depositing machine comprising a base, a drum assembly rotatably mounted on said base including means to receive and to discharge granular or liquid material, said discharge means including rotary measuring valves spaced around the periphery of said drum assembly, said valves having means for measuring increments of material and discharging the material from said drum assembly at right angles to the axis of the drum assembly through openings cooperating with the valves on the outside periphery of the drum assembly, each valve including a plurality of circumferentially positioned pockets for measuring and receiving material from said drum assembly, means for rotating said valves successively a predetermined amount, said valves being rotatable on an axis parallel to the axis of the drum assembly, and means for actuating said last-named means including a movable actuating member adapted to be contacted by a moving can, or the like, said actuating member being biased to a normal non-operating position to prevent operation of said valve rotating means when no can, or the like, is ready to receive a charge from said drum assembly.

10. In a rotary depositing machine, a rotatably mounted drum assembly comprising a drum having a material receiving compartment, rotatable material discharge valves mounted in said drum having a plurality of pockets, said pockets being formed with wide discharge mouth and shallow depth to quickly release material through said drum openings under the effect of centrifugal force when said drum is rotated rapidly, said rotation of the valves being with respect to the drum assembly to aid in compacting the charges for quick discharge, said pockets opening radially inwardly and outwardly for receiving and discharging said material, said drum having openings facing radially outwardly and in communication with the outwardly opening pockets in the drum periphery adjacent each valve, and means for rotating said valves to successively disposed pockets of material in said openings as discharge is required.

11. A rotary depositing machine comprising a base, a drum assembly having a plurailty of compartments rotatably mounted on said base including means to receive and to discharge granular or liquid material, said discharge means including rotary valves spaced around the periphery of said drum assembly for measuring and discharging increments of material from said drum assembly, each valve including a plurality of chambers, each chamber being partitioned to provide measuring pockets for measuring and receiving materials from said drum assembly, there being the same number of pockets for each chamber to simultaneously and individually receive said materials as there are compartments in the drum assembly, said pockets opening radially inwardly and outwardly for receiving and discharging said material, said drum having openings in its periphery adjacent each valve, and means for rotating said valves to successively dispose pockets of material in said openings as discharge is required.

References Cited in the file of this patent

UNITED STATES PATENTS

| | | |
|---|---|---|
| 1,122,334 | Taylor | Dec. 29, 1914 |
| 1,502,992 | Lamphere | July 29, 1924 |
| 2,028,266 | Anderson | Jan. 21, 1935 |
| 2,529,445 | Betz | Nov. 7, 1950 |
| 2,588,483 | Chapman | Mar. 11, 1952 |